United States Patent
Bai et al.

(10) Patent No.: US 7,353,285 B2
(45) Date of Patent: Apr. 1, 2008

(54) APPARATUS, SYSTEM, AND METHOD FOR MAINTAINING TASK PRIORITIZATION AND LOAD BALANCING

(75) Inventors: Angqin Bai, Tucson, AZ (US); Alex Q. Chen, Tucson, AZ (US); James Chien-Chiung Chen, Tucson, AZ (US); Theodore Timothy Harris, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 10/717,942

(22) Filed: Nov. 20, 2003

(65) Prior Publication Data

US 2005/0114286 A1    May 26, 2005

(51) Int. Cl.
    *G06F 15/16*    (2006.01)
(52) U.S. Cl. .................. 709/235; 718/102; 370/237
(58) Field of Classification Search ............... 709/235; 718/102; 370/237
    See application file for complete search history.

(56) References Cited

U.S. PATENT DOCUMENTS

| 4,577,272 | A | * | 3/1986 | Ballew et al. ............ 709/239 |
| 5,247,671 | A |   | 9/1993 | Adkins et al. ............ 395/650 |
| 5,745,736 | A |   | 4/1998 | Picart .................... 395/500 |
| 2003/0147350 | A1 |   | 8/2003 | Wookey et al. .......... 370/231 |
| 2003/0149598 | A1 |   | 8/2003 | Santoso et al. .......... 705/2 |

FOREIGN PATENT DOCUMENTS

| JP | 9091157 A | 4/1997 |
| JP | 2002077308 | 3/2002 |

OTHER PUBLICATIONS

AN-7100718, "Real-time data transmission mechanism in optical fiber industrial network." Huang Haifeng, et al. Chinese Journal of Electronics, vol. 10, No. 4, pp. 511-515, Oct. 2001.
AN-7100326, "Implementation of Progressive data transmission in distributed virtual environment." Xiaohong Jiang, et al. The International Society for Optical Engineering, vol. 4303, pp. 159-166, 2001.
"Prioritized Resource Allocation for Stressed Networks" Beard, CC. et al.; 1999/2000; IEEE/ACM Transactions on Networking, vol. 9, No. 5, Oct. 2001.
"A SMART Scheduler for Multimedia Applications" Nieh, J. et al.; 2003; ACM Transactions on Computer Systems, vol. 21, No. 2, May 2003, pp. 117-163.

* cited by examiner

*Primary Examiner*—Nathan Flynn
*Assistant Examiner*—Michael E Keefer
(74) *Attorney, Agent, or Firm*—Kunzler & McKenzie

(57) ABSTRACT

An apparatus, system, and method are provided for maintaining task prioritization and load balancing of I/O tasks on servers coupled by a plurality of communication channels. The apparatus includes a task controller for maintaining system resources on a failed target channel while resubmitting an unsuccessful task to a different channel. Also, the apparatus includes an upgrade module for upgrading a task prioritization level of a failed I/O task. Additionally, a load module is provided for balancing I/O tasks evenly across the plurality of communication channels according to a prioritization algorithm. The system includes the task controller and a device controller configured to interface with the task controller. The method includes a computer readable medium with computer readable code for selecting a channel, upgrading the prioritization level of a failed task, and maintaining resources on the failed channel while resubmitting the failed I/O task on a different channel.

23 Claims, 5 Drawing Sheets

APPARATUS, SYSTEM, AND METHOD FOR MAINTAINING TASK PRIORITIZATION AND LOAD BALANCING

BACKGROUND OF THE INVENTION

1. Field of the Invention

The invention relates to input/output (I/O) tasks and data transfer between storage devices, and more particularly relates to maintaining task prioritization and load balancing of I/O tasks with consistently intermittent failures.

2. Description of the Related Art

The explosion of information created by e-business is making storage a strategic investment priority for companies of all sizes. The nature of e-business requires storage that supports data availability so that employees, customers and trading partners can access the data at any time during any day through reliable, disaster-tolerant systems. In the event of a disaster, high data availability and recovery are essential to maintaining business continuity.

In order to prevent data loss during a disaster, such as a system failure or natural disaster, many companies rely on storage backups. A backup of data may be stored on removable media, such as tapes or writable optical disks. While removable media may be suitable for small companies, large corporations require immense amounts of storage capacity and therefore removable media is not a viable option for data backup. One solution for large corporations is storage servers. Storage servers are typically located on a common business network and configured to share data with nodes on the network. One such implementation is a storage area network (SAN). A SAN is a high-speed subnetwork of shared storage devices. A storage device is a machine that contains a disk or disks for storing data. Additionally, storage servers may be located remotely in order to provide data redundancy in the event of a complete site failure.

Storage servers support many data copy options. One widely used method of data transfer from a primary storage server to a remote storage server is peer-to-peer remote copy (PPRC). The PPRC function is a hardware-based solution for mirroring logical volumes from a primary site (the application site) onto the volumes of a secondary site (the recovery or remote site). PPRC can be managed using a Web browser to interface with the storage server or using commands for selected open systems servers that are supported by the storage server command-line interface. Additionally, copy functions such as flashcopy, PPRC extended distance copy, and extended remote copy are implemented.

Copy functions are processed over a variety of transmission mediums. Storage servers support a variety of connection interfaces. Such interfaces include Fibre Channel, 2 Gigabit Fibre Channel/FICON™, Ultra SCSI and ESCON®. Typically, multiple paths or channels exist between the primary site and the recovery site. Although multiple paths couple the primary and recovery sites, I/O tasks far outnumber the paths and therefore a task queue is necessary. However, certain types of data, such as customer data, are of greater importance than other types. Priority I/O queuing defines levels of prioritization for different types of data. For example, customer data would be assigned a high priority while a background data copy would be assigned a low priority.

In order to balance I/O tasks across the multiple paths that connect the primary and recovery sites, a prioritization algorithm is implemented. One example of a prioritization algorithm is to dedicate 70% of the resources of the path to high priority tasks, 20% to medium priority, and 10% to low priority. When a task is received at the primary site or server, a path to the recovery site is selected. Typically, the path with the lowest bandwidth usage is selected for the transfer. Once selected, a counter indicating system resource usage is incremented and the I/O task is started. Upon completion, the counter is decremented.

However, if there is a problem port or path that fails, all tasks that have selected the failed path will fail. Upon failure, tasks are retried on a different path, but the failed tasks are placed in the queue ahead of tasks already assigned to the new path. Commonly, once a task is retried the counter on the failed path is decremented. Since the path selection process is generally based upon the bandwidth usage of each path, the failed path is seen as the most available for subsequent tasks. A situation may arise where the failed path is selected for all low priority tasks because of the low bandwidth, and subsequently the low priority tasks fail and are retried on different paths ahead of high priority tasks on those paths. This defeats the purpose of task prioritization.

What is needed is an apparatus, system, and method that maintains task prioritization and load balancing. Beneficially, such an apparatus, system, and method would maintain the count on a bandwidth counter while a task is retried on a different path in order to prevent subsequent I/O tasks from being processed on the failed path.

SUMMARY OF THE INVENTION

The present invention has been developed in response to the present state of the art, and in particular, in response to the problems and needs in the art that have not yet been fully solved by currently available prioritization devices. Accordingly, the present invention has been developed to provide an apparatus, system, and method for maintaining task prioritization and load balancing that overcome many or all of the above-discussed shortcomings in the art.

The apparatus for prioritization is provided with a logic unit containing a plurality of modules configured to functionally execute the necessary steps of maintaining prioritization. These modules in the described embodiments include a prioritization apparatus for data in a communication channel. The prioritization apparatus may comprise a prioritization module configured to define a plurality of prioritization levels, a communication module configured to process tasks over a plurality of channels, an upgrade module configured to upgrade the prioritization level of unsuccessful tasks, and a task controller configured to maintain system resources on a failed target channel while resubmitting an unsuccessful task to a different channel.

The task controller may be configured to communicate with a status module operatively coupled to a target device. In one embodiment, the task controller is configured with a counter that is updateable and indicates system resource usage of the target device. The target device may be a computer readable storage device. Additionally, the task controller may also comprise a load module configured to distribute tasks across the plurality of communication channels according to a load balancing scheme.

A device controller apparatus is also provided. The device controller apparatus may comprise a status module configured to track system resources of a device, a counter configured to count connections from a task controller over a plurality of communication channels, and a task processing module configured to receive tasks with upgraded prioritization levels. In one embodiment, the status module is configured to receive a task from a task controller. Also, the status module is further configured to receive tasks of different priorities according to a predefined prioritization scheme. The task processing module is further configured to place tasks with upgraded prioritization levels at the beginning of the queue for processing.

In one embodiment, the task processing module is configured to maintain system resources on a failed channel while the task is resubmitted to a different channel. The task processing module is configured to release system resources after the failed task is successfully completed on a different channel.

The present invention also includes a system for task prioritization. In one embodiment, the system comprises a data communications network comprising a plurality of communication channels, a target device coupled to the network, the target device configured to receive tasks over the network, the target device comprising a status module configured to track system resources, a server coupled to the network, the server configured to receive read/write tasks from a client device and transfer the task to the target device, a task controller coupled to the server and configured to maintain system resources on a failed target channel while resubmitting the unsuccessful task to a different channel, and an upgrade module operatively coupled to the server, the upgrade module configured to upgrade the prioritization level of an unsuccessful task and communicate the unsuccessful task from to a different channel.

A computer readable storage medium is also provided. The computer readable storage medium may comprise computer readable code configured to carry out a process for maintaining task prioritization and load balancing. The process in the disclosed embodiments substantially includes the steps necessary to carry out the functions presented above with respect to the operation of the described apparatus and system. In one embodiment, the process comprises selecting a communication channel, processing a task over the selected communication channel, and updating a counter according to utilized system resources, upgrading a prioritization level of an unsuccessful task and communicating the unsuccessful task to a different channel, and maintaining system resources on a failed target channel while resubmitting an unsuccessful task to a different channel.

Additionally, the process may comprise incrementing the target counter prior to processing the task, and incrementing and decrementing counters on subsequent failed channels. Also, the process may comprise decrementing the target counter after the task successfully completes on a different channel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
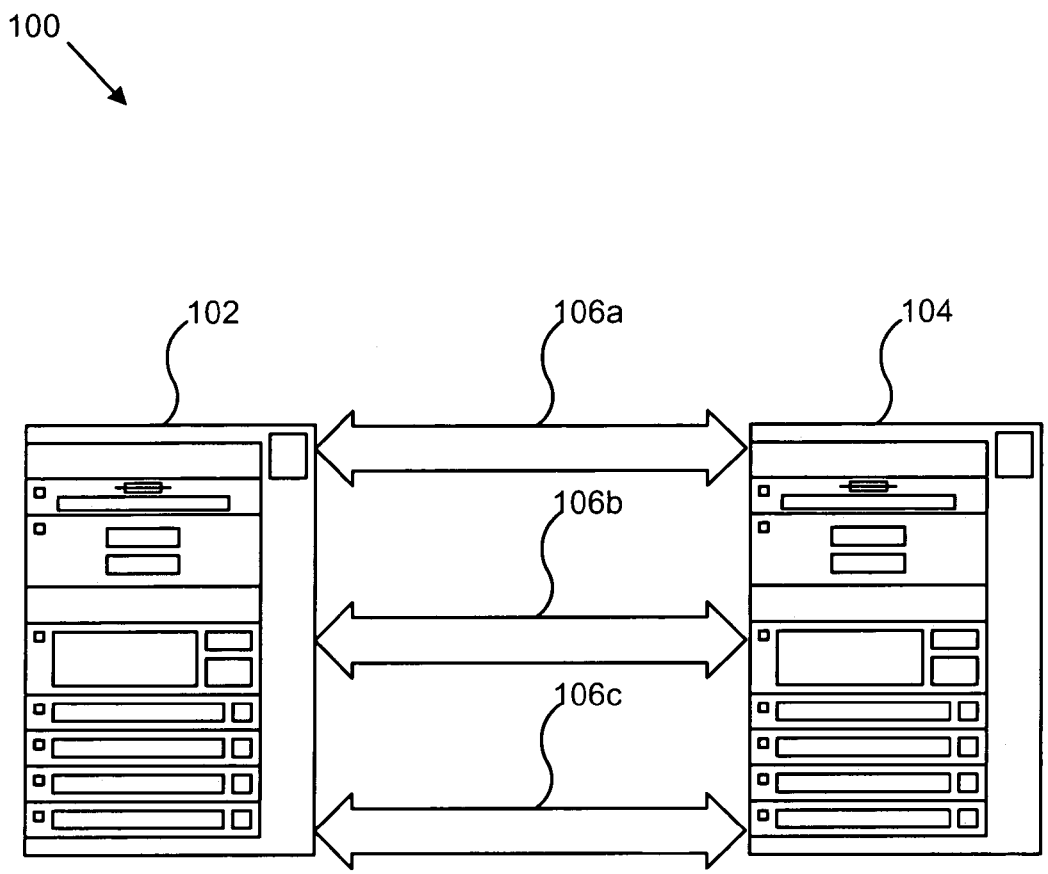
FIG. 1 is a schematic block diagram illustrating one embodiment of a system for maintaining task prioritization and load balancing in accordance with the present invention.

FIG. 1 is a schematic block diagram illustrating one embodiment of a system 100 for task prioritization and load balancing. The system 100 may comprise a primary site server 102 and a target or recovery site server 104. In one embodiment, the primary and target servers 102, 104 may comprise enterprise class storage servers, or small office storage servers, both with off-site data backup servers. Alternatively, the system 100 may represent data transfer between a plurality of electronic devices. Furthermore, in one embodiment the target site server 104 may comprise a plurality of storage devices for maintaining a copy of the data stored on the primary site server 102. Additionally, the primary and target site servers 102, 104 may be located within a common local area network, storage area network, or wide area network.

Coupling the primary and recovery site servers 102, 104 is a plurality of communication channels 106a, 106b, 106c. Examples of communication channels 106a, 106b, 106c include, but are not limited to, Fibre Channel, 2 Gigabit Fibre Channel/FICON™, Ultra SCSI and ESCON®. A variety of tasks are processed across the communication channels 106a, 106b, 106c. For example, customer data such as transactions in retail stores or websites may be transmitted to the target server 104.

In order to balance input/output (I/O) tasks across the multiple paths that connect the primary and recovery sites, a prioritization algorithm is implemented. In one embodiment, tasks are assigned a priority of high, medium, or low. Task prioritization assignment is well known to one skilled in art, and will not be discussed further herein. One example of a prioritization algorithm is to dedicate 70% of the resources of the path to high priority tasks, 20% to medium priority, and 10% to low priority. Path resources may include channel 106a, 106b, 106c bandwidth, processor resources, memory resources, and storage medium resources.

Figure 2:
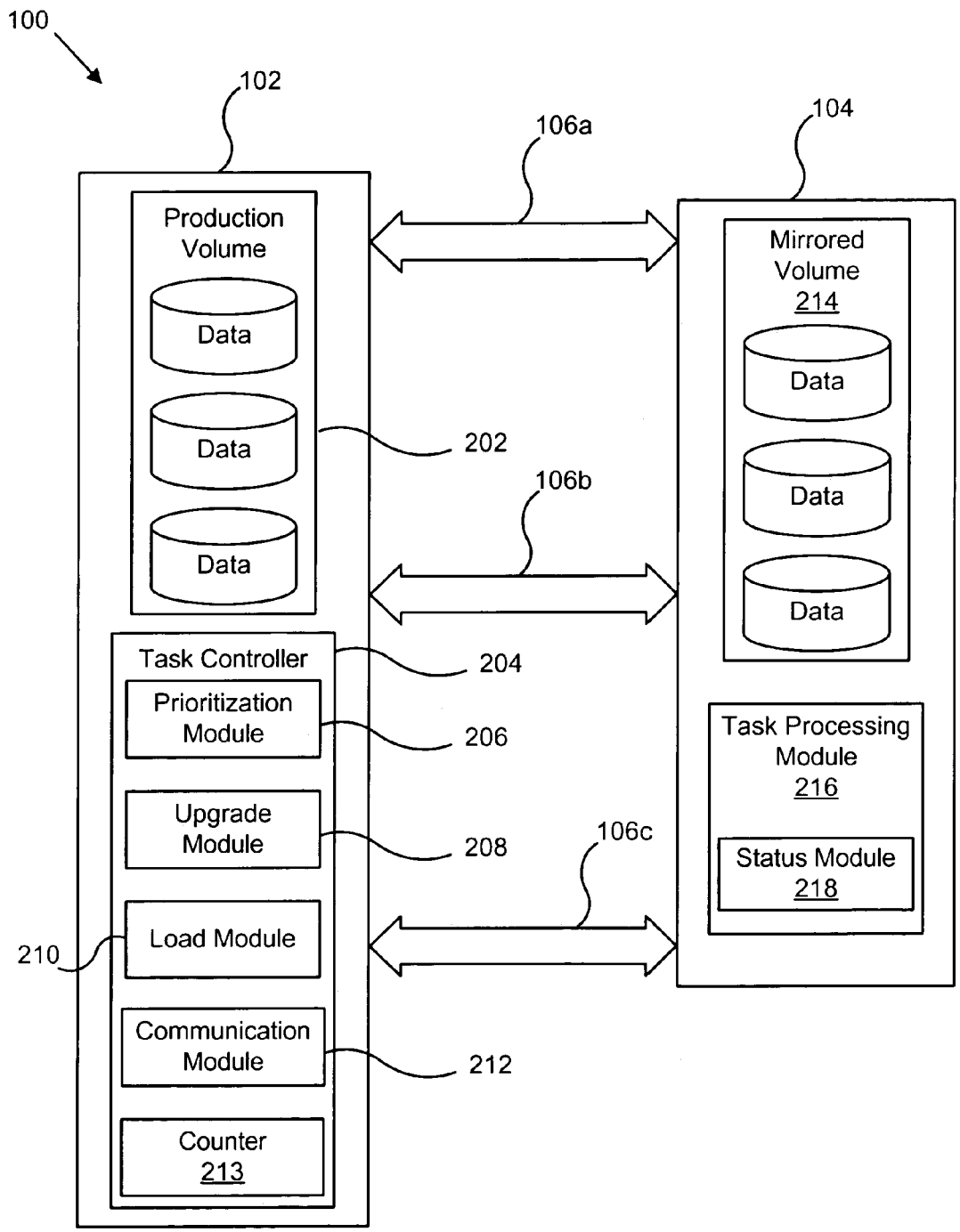
FIG. 2 is a schematic block diagram illustrating one embodiment of an apparatus for maintaining task prioritization and load balancing in accordance with the present invention.

FIG. 2 is a schematic block diagram illustrating one embodiment of the system 100. Shown herein are the primary site server 102, and the target site server 104. In one embodiment, the primary site server 102 may comprise a production volume 202, and a task controller 204. The production volume 202 may be configured as a plurality of storage disks formed in a redundant array of inexpensive disks (RAID). Alternatively, the production volume 202 may comprise any computer readable storage medium including, but not limited to, tape drives, random access memory, read only memory, and optical disks.

In one embodiment, the task controller 204 comprises a prioritization module 206, an upgrade module 208, a load module 210, and a communication module 212. A counter 213 may also be provided that is updateable and indicates system resource usage of the target device. The task controller 204 is configured to receive tasks from a client device (not shown) and communicate this task with the production volume 202. A second or mirrored copy of the task is also prepared by the task controller 204 for processing over one of the plurality of channels 106a, 106b, or 106c to the target site server 104. The prioritization module 206 may be configured to assign a prioritization level to the task. Alternatively, the prioritization module 206 is configured to store the prioritization algorithm or load balancing scheme.

The upgrade module 208 maybe configured to upgrade the prioritization level of a task that has failed to process. In the event of a failure, the upgrade module 208 promotes the level of prioritization of the task and sends the task to the communication module 212 to be resubmitted to a different channel. The load module 210 ensures that the tasks are evenly distributed across the plurality of channels 106 according to the prioritization algorithm. In one embodiment, a task queue is implemented as a counter 213. The counter 213 may be configured to count the number of I/O tasks to be processed on each channel. Each channel 106a, 106b, 106c may be configured with a dedicated counter 213. Alternatively, the primary site server 104 may be configured with a plurality of counters 213.

In one embodiment, the target site server 104 comprises a mirrored volume 214, and a task processing module 216. The mirrored volume 214 may be configured as a plurality of storage disks formed in a RAID. Alternatively, the mirrored volume 214 may comprise any computer readable storage medium including, but not limited to, tape drives, random access memory, read only memory, and optical disks.

The task processing module 216 may be configured to receive I/O tasks from the primary site server 102, and process the tasks. In one embodiment, processing the I/O tasks comprises writing data to the mirrored volume 214. The task processing module 216 is configured with various types of writing methods. For example, flashcopy, peer-to-peer remote copy, and extended remote copy. The methods for transferring data are well known co to those skilled in the art and will not be discussed in greater detail herein. The task processing module 216 may be configured to receive I/O tasks of different prioritization levels, and process the tasks according to the above described prioritization algorithm.

In one embodiment, the task processing module 216 is configured with a task queue (not shown) for each communication channel 106a, 106b, or 106c coupled to the target site server 104. As depicted, the system 100 is configured with three communication channels 106a, 106b, 106c. Alternatively, the system 100 may comprise any number of communication channels 106 deemed necessary to efficiently process I/O tasks between at least two servers. The status module 218 may be configured to track system resources in use on each channel 106a, 106b, 106c.

The task controller 204 selects a channel 106a, 106b, 106c according to the counter 213. For example, if the counter 213 coupled to channel 106b is lower than the counters 213 for channels 106a, or 106c then the task controller 204 will select channel 106b to process the task.

Figure 3:
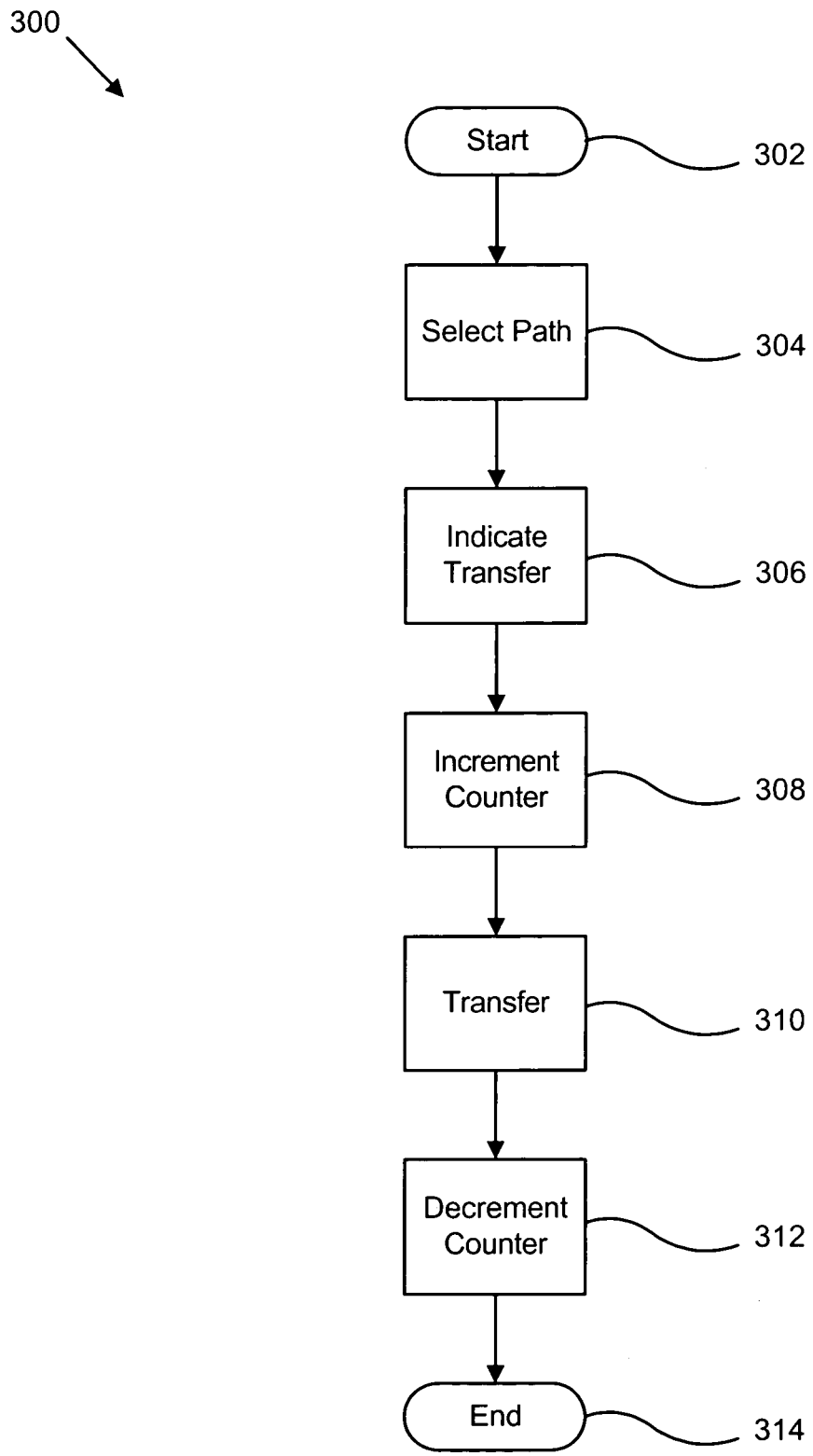
FIG. 3 is a schematic flow chart diagram illustrating one embodiment of a method for successful task processing in accordance with the present invention.

FIG. 3 is a schematic block diagram illustrating one embodiment of a method 300 for successfully processing an I/O task of the present invention. The method 300 starts 302 and the load module 210 selects 304 a path or channel 106a, 106b, 106c. Selecting 304 a path in one embodiment comprises determining which channel 106a, 106b, 106c has the lowest count according to the counter 213. The communication module 212 then indicates 306 a transfer, and subsequently the task controller 204 increments 308 the counter 213. Once the I/O task is transferred 310 or processed, the task controller 204 decrements the counter 213 and the method 300 ends 314.

Figure 4:
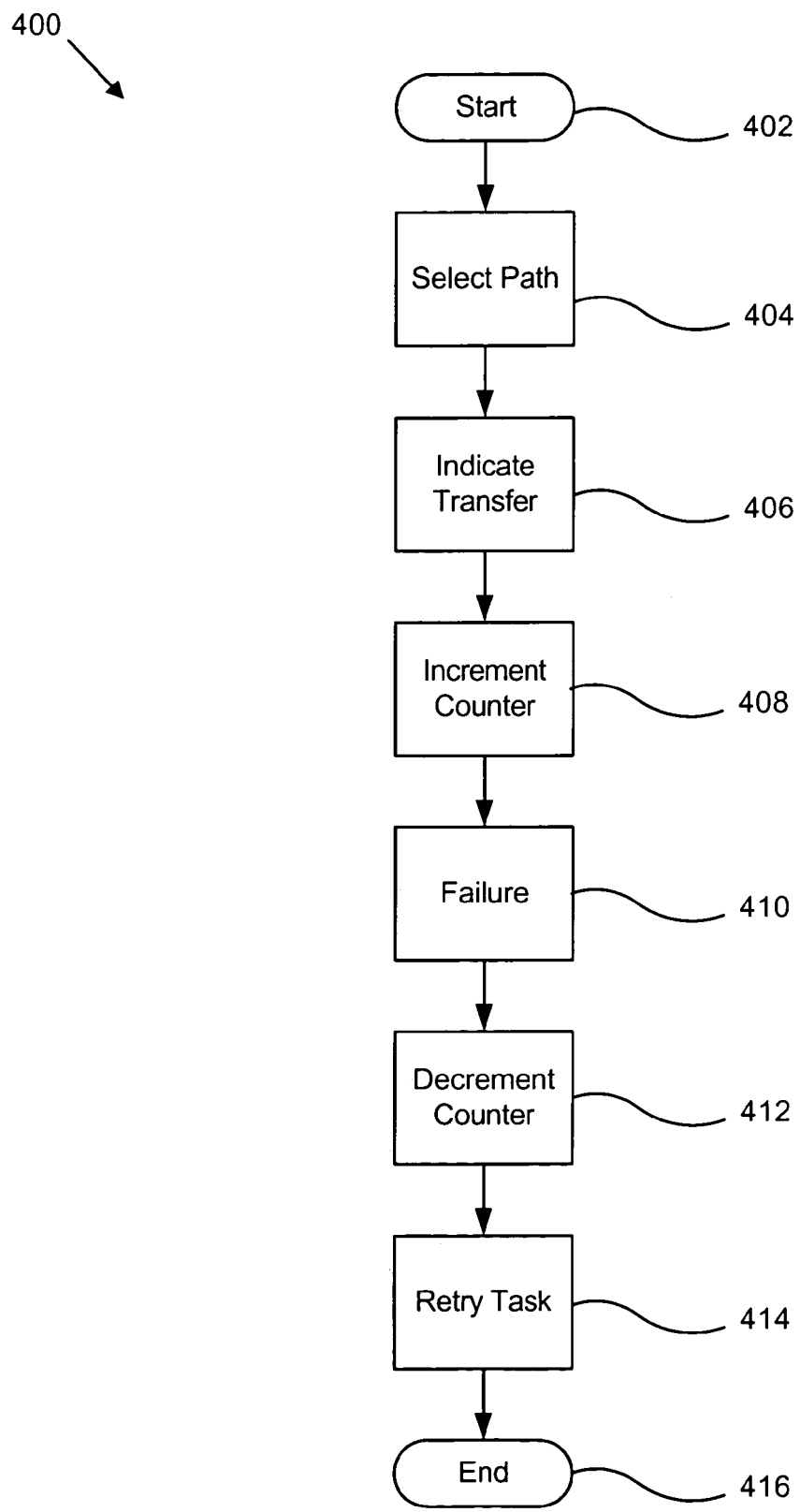
FIG. 4 is a schematic flow chart diagram illustrating one embodiment of a method for high priority task processing failures in accordance with the present invention.

Referring now to FIG. 4, shown therein is a schematic flow chart diagram illustrating one embodiment of a method 400 for a high priority task failure of the present invention. The method 400 starts 402 and the load module 210 selects 404 a path or channel 106a, 106b, 106c. Selecting 404 a path comprises determining which channel 106a, 106b, 106c has the lowest count according to the counter 213. The communication module 212 then indicates 406 a transfer, and subsequently the task controller 204 increments 408 the counter 213. A failure occurs 410, and the counter 213 is decremented 412. The task controller 204 then retries 414 the task on a different channel 106a, 106b, 106c. The prioritization algorithm is maintained because a high priority task is not upgraded when retried. The method 400 then ends 416.

However, when a low priority task fails, the low priority task is retried as a high priority task. In one embodiment, the upgrade module 208 upgrades the priority from low to high priority. Alternatively, the priority of the task is maintained as low but the task is retried immediately on a different channel without waiting for other high priority tasks to complete. When a channel 106a, 106b, 106c or path consistently fails, a steady stream of low priority tasks are retried as high priority tasks. This effectively circumvents the prioritization algorithm and defeats the purpose of priority I/O queuing. The following method of the present invention overcomes the problem of prioritization circumvention.

Figure 5:
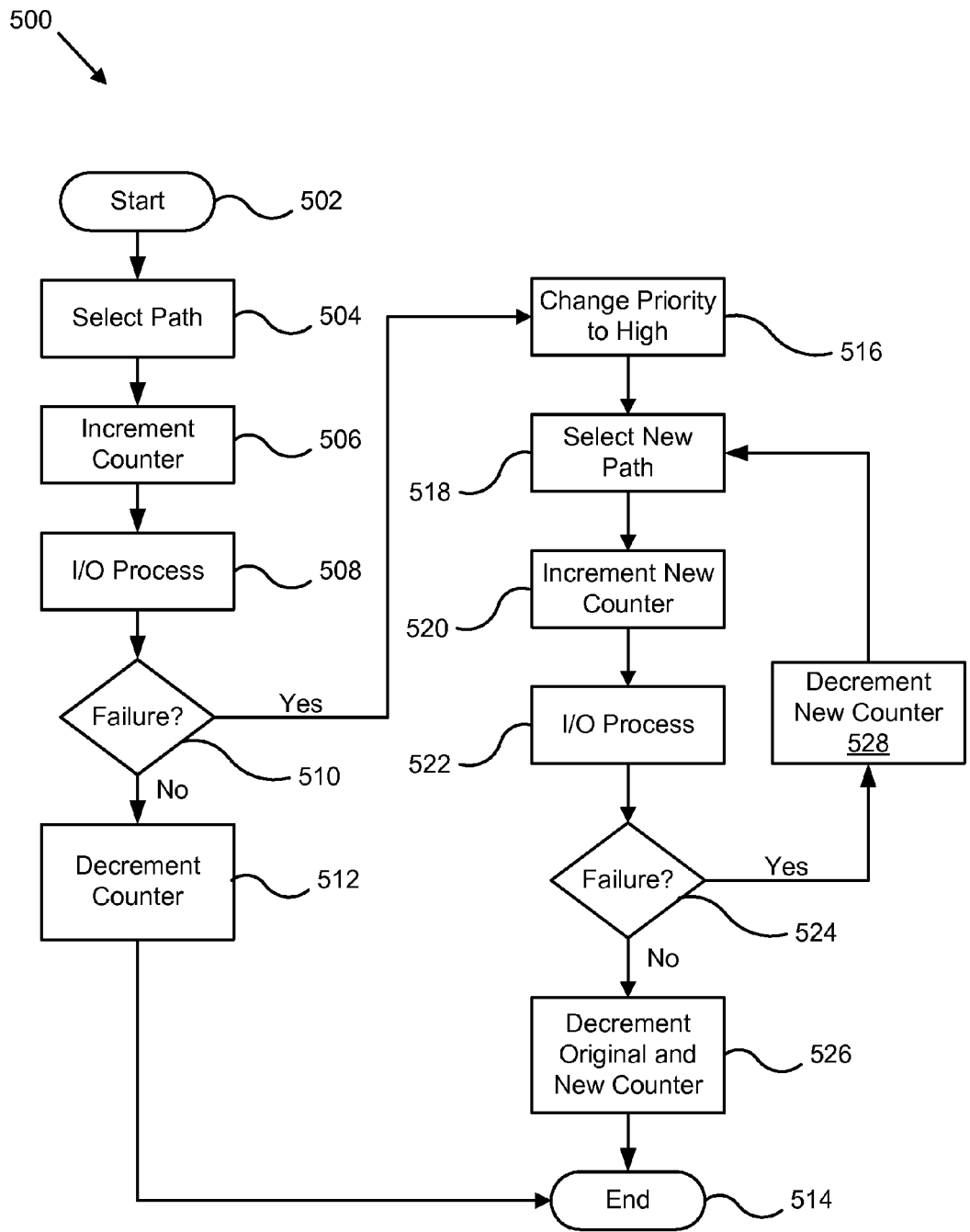
FIG. 5 is a schematic flow chart diagram illustrating one embodiment of a method for maintaining task prioritization and load balancing for low priority task processing failures in accordance with the present invention.

FIG. 5 is a schematic flow chart diagram illustrating one embodiment of a method 500 for maintaining task prioritization and load balancing for low priority task failures in accordance with the present invention. The method 500 starts 502 and the load module 210 selects 504 a path or channel 106a, 106b, 106c. Selecting 504 a path comprises determining which channel 106a, 106b, 106c has the lowest count according to the counter 213. The task controller 204 then increments 506 the counter 213. The I/O task is processed 508 by the task controller 204. If there is no failure 510, the counter 213 is decremented 512 and the method 500 ends 514.

However, if a failure occurs 510, the upgrade module 208 changes 516 the task prioritization to a high level, and the load module 210 selects 518 a new path or channel 106a, 106b, 106c. The counter 213 on the new channel is incremented 520 while maintaining the count on the original channel. By maintaining the count on the original channel, low priority tasks are not sent to the intermittently failing channel. Therefore, additional low priority tasks are prevented from being upgraded into high priority tasks and the prioritization algorithm is preserved. The I/O task is processed 522 by the task processing module 216, and if no failure 524 is detected the counters 213 on the original failed channel and the new channel are decremented 526 and the method 500 ends 514. Upon decrementing the counters 213, the system resources are freed in order to process subsequent I/O tasks.

At times, the second channel may fail 524 and the task controller 204 must resubmit for a second time the I/O task. In this described embodiment, the second channel counter 213 is decremented 528 while the original counter 213 is maintained. In one embodiment, the original counter 213 may be configured to maintain the count until the I/O task is completed on a different channel. However, the count on subsequent failed channels is decremented. Once the second channel is decremented, a third channel may be selected 518 and the counter 213 on the third channel is incremented 520. Upon a successful 524 completion of the I/O task, the original counter 213 and the third counter 213 are decremented 526 and the method 500 ends 514. Alternatively, if the I/O task fails on the third channel 524, the selection 518 process starts again as described above. An I/O task may conceivably fail on a plurality of ports or channels prior to completion. In such a scenario, the original counter 213 will not be decremented 526 until the I/O task is completed, thereby occupying system resources and preventing additional I/O tasks from being processed on the failed port or channel 106a, 106b, 106c.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A prioritization apparatus for data in a communication channel, comprising:
   a prioritization module comprising executable code stored on a storage device, executed by a processor, and configured to define a plurality of prioritization levels;
   a communication module comprising executable code stored on the storage device, executed by the processor, and configured to process tasks over a plurality of communication channels and indicate that tasks are processed on selected communication channels;
   an upgrade module comprising executable code stored on the storage device, executed by the processor, and configured to upgrade the prioritization level of unsuccessful tasks; and
   a task controller comprising executable code stored on the storage device, executed by the processor, and configured to increment a counter for a selected communication channel, decrement the counter of the selected communication channel if the task is processed, and if the task is unsuccessful, maintain system resources on the failed selected target channel by maintaining a count of the counter of the failed selected communication channel while resubmitting the unsuccessful task to a different channel and decrementing the counter of the failed selected communication channel when the task is successfully processed on the different channel.

2. The prioritization apparatus of claim 1, wherein the task controller is further configured to communicate with a status module, the status module configured to indicate system resource usage of a target device operatively coupled to the channel.

3. The prioritization apparatus of claim 2, wherein the target device further comprises a computer readable storage device.

4. The prioritization apparatus of claim 1, wherein the task controller further comprises a load module comprising executable code stored on the storage device, executed by the processor, and configured to distribute tasks across the plurality of communication channels according to a load balancing scheme.

5. The prioritization apparatus of claim 4, wherein the load balancing scheme dedicates a majority of system resources to tasks with a high priority, and a minority of system resources to tasks with a lower priority.

6. The prioritization apparatus of claim 1, wherein the task controller further comprises a plurality of counters for each of the plurality of channels, the counters configured to track system resource usage of the plurality of channels.

7. A device controller apparatus, comprising:
a prioritization module comprising executable code stored on a storage device, executed by a processor, and configured to define a plurality of prioritization levels;
a communication module comprising executable code stored on the storage device, executed by the processor, and configured to process tasks over a plurality of communication channels and indicate that tasks are processed on selected communication channels;
an upgrade module comprising executable code stored on the storage device, executed by the processor, and configured to upgrade the prioritization level of unsuccessful task;
a status module comprising executable code stored on the storage device, executed by the processor, and configured to track system resources of a device; and
a task processing module comprising executable code stored on the storage device, executed by the processor, and configured to receive tasks with upgraded prioritization levels, increment a counter for a selected communication channel, decrement the counter of the selected communication channel if the task is processed, and if the task is unsuccessful, maintain system resources on the failed selected target channel by maintaining a count of the counter of the failed selected communication channel while resubmitting the unsuccessful task to a different channel and decrementing the counter of the failed selected communication channel when the task is successfully processed on the different channel.

8. The device controller apparatus of claim 7, wherein the task processing module is further configured to receive tasks of different priorities according to a predefined prioritization scheme.

9. The device controller apparatus of claim 7, further comprising a queue of tasks to be processed.

10. The device controller apparatus of claim 7, wherein the task processing module is further configured to place tasks with upgraded prioritization levels at the beginning of the queue for processing.

11. The device controller apparatus of claim 7, wherein the task processing module is configured to release system resources after the failed task is successfully processed on the different channel.

12. The apparatus of claim 7, further comprising a computer readable storage device coupled to the apparatus and configured to process read/write tasks received from the task controllers.

13. The apparatus of claim 12, wherein the computer readable storage device is configured to process input/output tasks from the plurality of task controllers.

14. A system for task prioritization, the system comprising:

a data communications network comprising a plurality of communication channels;
a target device coupled to the network, the target device configured to receive tasks over the network, the target device comprising a status module comprising executable code stored on a storage device, executed by a processor, and configured to track system resources;
a server coupled to the network, the server configured to receive read/write tasks from a client device and transfer the task to the target device;
a task controller coupled to the server and configured increment a counter for a selected communication channel, decrement the counter of the selected communication channel if the task is processed, and if the task is unsuccessful, to maintain system resources on the failed selected target channel by maintaining a count of the counter of the failed selected communication channel while resubmitting the unsuccessful task to a different channel and decrementing the counter of failed the selected communication channel when the task is successfully processed on the different channel; and
an upgrade module comprising executable code stored on the storage device, executed by the processor, and operatively coupled to the server, the upgrade module configured to upgrade the prioritization level of the unsuccessful task and communicate the unsuccessful task to the different channel.

15. The system of claim 14, further comprising a prioritization module comprising executable code stored on the storage device, executed by the processor, and coupled to the server and configured to define a plurality of prioritization levels.

16. The system of claim 14, wherein the counter is updateable and configured to indicate system resource usage of the target device.

17. The system of claim 14, wherein the prioritization module is configured to allocate a majority of system resources to a task with a higher priority and a minority of system resources to a task with a lower priority.

18. A method for maintaining task prioritization and load balancing, the method comprising:
selecting a communication channel, processing a task over the selected communication channel, and updating a counter according to utilized system resources by incrementing the counter for the selected communication channel and decrementing the counter of the selected communication channel if the task is processed;
upgrading a prioritization level of the task and communicating the task to a different channel if the task is unsuccessful; and
maintaining system resources on the failed selected target channel by maintaining a count of the counter of the failed selected communication channel while resubmitting the unsuccessful task to a second channel and decrementing the counter of the failed selected communication channel when the task is successfully processed on the second channel.

19. The method of claim 18, wherein selecting a communication channel comprises distributing tasks across the plurality of communication channels according to a load balancing scheme.

20. The method of claim 18, further comprising incrementing a second counter on the second channel when processing the unsuccessful task on the second channel.

21. A computer readable storage medium comprising computer readable code configured to carry out a process for maintaining task prioritization and load balancing, the process comprising:

selecting a communication channel, processing a task over the selected communication channel, and updating a counter according to utilized system resources by incrementing the counter for the selected communication channel and decrementing the counter of the selected communication channel if the task is processed;

upgrading a prioritization level of the task and communicating the task to a different channel if the task is unsuccessful; and maintaining system resources on a failed target channel by maintaining a count of the counter of the failed selected communication channel while resubmitting the unsuccessful task to a different channel and decrementing the counter of the failed selected communication channel when the task is successfully processed on the different channel.

22. The process of claim 21, wherein selecting the communication channel comprises distributing tasks across the plurality of communication channels according to a load balancing scheme.

23. A prioritization apparatus for data in a communication channel, comprising:

means for defining a plurality of prioritization levels;

means for upgrading the prioritization level of a task and communicating the task to a different channel if the task is unsuccessful;

means for selecting a communication channel, processing a task over the selected communication channel, and updating a counter according to utilized system resources by incrementing the counter for the selected communication channel and decrementing the counter of the selected communication channel if the task is processed;

means for maintaining system resources on the failed selected target channel by maintaining a count of the counter of the failed selected communication channel while resubmitting the unsuccessful task to a different channel and decrementing the counter of the failed selected communication channel when the task is successfully processed on the different channel;

means for transmitting and receiving tasks over the plurality of communication channels; and means for distributing tasks across the plurality of communication channels according to a load balancing scheme.

* * * * *